United States Patent
Miyoshi et al.

(10) Patent No.: US 12,172,558 B2
(45) Date of Patent: Dec. 24, 2024

(54) CONVEYANCE SEAT (71) Applicant: TS TECH CO., LTD., Saitama (JP)

(72) Inventors: Takako Miyoshi, Tochigi (JP); Takayuki Kobori, Tochigi (JP); Akio Seya, Tochigi (JP); Hiroki Shibayama, Tochigi (JP); Kazuyoshi Iizuka, Tochigi (JP); Ai Furuta, Tochigi (JP); Kazuaki Mima, Tochigi (JP); Yuichiro Hoshi, Tochigi (JP); Tomohisa Chiba, Tochigi (JP); Kensuke Mori, Tochigi (JP); Hirokazu Onitsuka, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 83 days.

(21) Appl. No.: 17/911,814

(22) PCT Filed: Mar. 16, 2021

(86) PCT No.: PCT/JP2021/010681
§ 371 (c)(1),
(2) Date: Sep. 15, 2022

(87) PCT Pub. No.: WO2021/187496
PCT Pub. Date: Sep. 23, 2021

(65) Prior Publication Data
US 2023/0173959 A1 Jun. 8, 2023

Related U.S. Application Data (60) Provisional application No. 62/990,651, filed on Mar. 17, 2020, provisional application No. 63/037,229, (Continued)

(51) Int. Cl.
*B60N 2/30* (2006.01)

(52) U.S. Cl.
CPC .......... *B60N 2/309* (2013.01); *B60N 2/3075* (2013.01)

(58) Field of Classification Search
CPC ..... B60N 2/3072; B60N 2/3075; B60N 2/309
See application file for complete search history.

(56) References Cited

U.S. PATENT DOCUMENTS

| 6,644,730 B2 * | 11/2003 | Sugiura | B60N 2/305 |
|---|---|---|---|
| | | | 296/65.09 |
| 7,029,063 B2 * | 4/2006 | Holdampf | B60N 2/36 |
| | | | 297/15 |

(Continued)

FOREIGN PATENT DOCUMENTS

| JP | S60-168633 U | 11/1985 |
|---|---|---|
| JP | H09-118163 A | 5/1997 |

(Continued)

OTHER PUBLICATIONS

International Search Report mailed on May 25, 2021 for corresponding PCT Application No. PCT/JP2021/010681, with English translation.

*Primary Examiner* — Philip F Gabler
(74) *Attorney, Agent, or Firm* — Michael Best & Friedrich LLP (57) ABSTRACT

A conveyance seat accommodable in a recess of a floor includes: a seat cushion; a front leg portion which supports a front lower portion of the seat cushion and of which one end is rotatably fixed at the front lower portion of the seat cushion and the other end is detachably fixed at a position in front of the recess; a rear leg portion which supports a rear lower portion of the seat cushion and of which one end is rotatably fixed at the rear lower portion of the seat cushion and the other end is rotatably fixed to the floor inside the recess; and an arm portion of which one end is rotatably fixed to the rear leg portion and the other end is fixable to the (Continued)

floor at a position behind the other end of the rear leg portion.

13 Claims, 10 Drawing Sheets

Related U.S. Application Data filed on Jun. 10, 2020, provisional application No. 63/037,234, filed on Jun. 10, 2020, provisional application No. 63/037,255, filed on Jun. 10, 2020, provisional application No. 63/037,290, filed on Jun. 10, 2020.

(56) References Cited

U.S. PATENT DOCUMENTS

| | | | | |
|---|---|---|---|---|
| 7,273,243 B2* | 9/2007 | Prugarewicz | ........ | B60N 2/3065 |
| | | | | 296/65.09 |
| 7,478,860 B2* | 1/2009 | Lawall | ................. | B60N 2/3011 |
| | | | | 296/65.01 |
| 7,699,399 B2* | 4/2010 | Satta | ....................... | B60N 2/206 |
| | | | | 297/378.12 |
| 8,123,272 B2* | 2/2012 | Ito | ......................... | B60N 2/3011 |
| | | | | 296/65.09 |
| 8,297,678 B2* | 10/2012 | Nakao | .................. | B60N 2/3065 |
| | | | | 296/65.09 |
| 10,106,060 B2* | 10/2018 | Ikawa | .................. | B60N 2/3065 |
| 2005/0006920 A1* | 1/2005 | Moriyama | ............ | B60N 2/2213 |
| | | | | 296/65.08 |
| 2005/0017532 A1 | 1/2005 | Oyama | | |
| 2009/0243323 A1* | 10/2009 | Mitsuhashi | .......... | B60N 2/3065 |
| | | | | 296/65.05 |

FOREIGN PATENT DOCUMENTS

| | | | |
|---|---|---|---|
| JP | 2001-030813 | A | 2/2001 |
| JP | 2004-276729 | A | 10/2004 |
| JP | 2005-041378 | A | 2/2005 |
| JP | 2009-173067 | A | 8/2009 |
| JP | 2009-196416 | A | 9/2009 |

* cited by examiner

FIG. 9

CONVEYANCE SEAT

CROSS-REFERENCE TO RELATED APPLICATIONS

This application is a National Entry application of PCT Application Serial Number PCT/JP2021/010681, filed Mar. 16, 2021. Further, this application claims priority from U.S. Provisional Patent Application Ser. Nos. 62/990,651, filed Mar. 17, 2020, 63/037,229, filed Jun. 10, 2020, 63/037,234, filed Jun. 10, 2020, 63/037,255, filed Jun. 10, 2020, and 63/037,290, filed Jun. 10, 2020, the entire contents of which are hereby incorporated by reference into this application.

TECHNICAL FIELD

The present invention relates to a conveyance seat and particularly to a conveyance seat which is accommodatable in a recess formed on a floor of a conveyance.

BACKGROUND ART

Conventionally, a structure is known in which a vehicle seat is accommodated in a recess formed on a floor by using a link arm (for example, PATENT LITERATURE 1).

CITATION LIST

Patent Literature

PATENT LITERATURE 1: JP 2005-41378 A

SUMMARY OF INVENTION

Technical Problem

The vehicle seat described in PATENT LITERATURE 1 can be switched in forms between a usage state and an accommodation state, but a method of adjusting a position of a seat to be seated in the usage state is not considered.

In recent years, it has been required to form a comfortable space even in a vehicle interior, and it is desirable that the seat that is accommodatable in the recess of the floor can be used in various states.

The present invention has been made in view of the above-described problems and an object thereof is to provide a conveyance seat which is accommodatable in a recess of a floor and in which a variation of a usage state is expanded.

Solution to Problem

The above-described problem is solved by a conveyance seat which is accommodatable in a recess formed on a floor of a conveyance, including: a seat cushion; a front leg portion which supports a front lower portion of the seat cushion and of which one end is rotatably fixed to the front lower portion of the seat cushion and the other end is detachably fixed to the floor at a position in front of the recess; a rear leg portion which supports a rear lower portion of the seat cushion and of which one end is rotatably fixed to the rear lower portion of the seat cushion and the other end is rotatably fixed to the floor inside the recess; and an arm portion of which one end is rotatably fixed to the rear leg portion and the other end is fixable to the floor at a position behind the other end of the rear leg portion.

Since the seat can be moved backward in a seatable state in such a manner that the front leg portion is removed from the floor, the seat cushion is moved backward, and the arm portion is fixed to the floor, the variation of the usage state can be expanded.

Further, the conveyance seat may further include: a front fixing portion which is provided on a front side of a front wall portion of the recess and fixes the other end of the front leg portion to the floor; a rear fixing portion which is provided inside the recess and fixes the other end of the rear leg portion to the floor; and an arm fixing portion which is provided behind the rear fixing portion and connects the other end of the arm portion to the floor.

Since the arm fixing portion is provided on the floor, the seat can be more rigidly fixed while being moved backward.

Further, in the conveyance seat, the length of the arm portion may be shorter than the length of the rear leg portion.

Since the length of the arm portion is shorter than the length of the rear leg portion, the height of the seat can be lower than that of the normal state while the arm portion is fixed to the floor and the variation of the usage state can be expanded.

In the conveyance seat, the other end of the arm portion may be fixed to the arm fixing portion to be slidable in a front to back direction.

Since the other end of the arm portion is slidably fixed to the arm fixing portion, the seat can be fixed while adjusting the front-back position and height of the seat and the variation of the usage state can be expanded.

Further, the above-described problem is solved by a conveyance seat which is accommodatable in a recess formed on a floor of a conveyance, including: a seat cushion; a seat back which is attached to the seat cushion to be tiltable forward; and a flap which is attached to be rotatable in a front to back direction on a back surface portion of the seat back, wherein the flap is erected while the seat back is tilted forward, and wherein a back surface of the seat back tilted forward is used as a seating surface and the erected flap is used as a backrest to be seatable.

Since the flap is provided on the back surface portion of the seat back, the back surface of the seat back is used as the seating surface, and the flap is used as the backrest, the variation of the usage state can be expanded.

The conveyance seat may further include: a cover portion which is folded between the back surface portion of the seat back and the flap while the seat back is erected, wherein the seat back may be tiled forward to erect the flap and the folded cover portion may be unfolded so that the cover portion is used as a stretched seating surface.

Since the area of the seating surface is expanded by unfolding the folded cover portion provided between the seat back and the flap, the variation of the usage state can be expanded.

In the conveyance seat, a wall portion may be provided behind the recess, and an inflatable or contractible airbag may be provided between the erected flap and the wall portion.

Since the airbag is provided between the flap and the wall portion, the inclination amount of the flap can be adjusted and the variation of the usage state can be expanded by the appropriate inclination amount of the flap.

Further, the above-described problem is solved by a conveyance seat which is accommodatable in a recess formed on a floor of a conveyance, including: a seat cushion; a front leg portion which supports a front lower portion of the seat cushion and of which one end is rotatably fixed at the front lower portion of the seat cushion and the other end is rotatably fixed inside the recess; and a rear leg portion which supports a rear lower portion of the seat cushion and of which one end is rotatably fixed at the rear lower portion of the seat cushion and the other end is rotatably fixed inside the recess, wherein at least one of the front leg portion and the rear leg portion is formed to be stretchable.

Since at least one of the front leg portion and the rear leg portion is formed to be stretchable, the seat can be fixed while adjusting the front-back position and height of the seat and the variation of the usage state can be expanded.

Advantageous Effects of Invention

According to the present invention, since the seat can be moved backward in a seatable state in such a manner that the front leg portion is removed from the floor, the seat cushion is moved backward, and the arm portion is fixed to the floor, the variation of the usage state can be expanded.

Further, since the arm fixing portion is provided on the floor, the seat can be more rigidly fixed while being moved backward.

Since the length of the arm portion is shorter than the length of the rear leg portion, the height of the seat can be lower than that of the normal state while the arm portion is fixed to the floor and the variation of the usage state can be expanded.

Further, since the other end of the arm portion is slidably fixed to the arm fixing portion, the seat can be fixed while adjusting the front-back position and height of the seat and the variation of the usage state can be expanded.

Since the flap is provided on the back surface portion of the seat back, the back surface of the seat back is used as the seating surface, and the flap is used as the backrest, the variation of the usage state can be expanded.

Since the area of the seating surface is expanded by unfolding the folded cover portion provided between the seat back and the flap, the variation of the usage state can be expanded.

Since the airbag is provided between the flap and the wall portion, the inclination amount of the flap can be adjusted and the variation of the usage state can be expanded by the appropriate inclination amount of the flap.

Since at least one of the front leg portion and the rear leg portion is formed to be stretchable, the seat can be fixed while adjusting the front-back position and height of the seat and the variation of the usage state can be expanded.

DESCRIPTION OF EMBODIMENTS

First Embodiment

Hereinafter, a configuration of a vehicle seat according to a first embodiment of the present invention will be described with reference to the drawings. However, the embodiments described below are for facilitating the understanding of the present invention and do not limit the present invention. That is, the present invention can be modified and improved without departing from the gist thereof, and it goes without saying that the present invention includes an equivalent thereof.

Further, in the following description, the contents relating to the material, shape, and size of the parts constituting the conveyance seat are merely specific examples, and do not limit the present invention.

Hereinafter, a vehicle seat S1 provided in a conveyance vehicle such as a minivan will be described as an example of a conveyance seat and a configuration example thereof will be described.

Further, in the following description, the "front to back direction" is the front to back direction of the vehicle seat and is the direction that coincides with the traveling direction when the vehicle is running. Further, the seat width direction is the width direction of the vehicle seat S1 and is the direction that coincides with the right and left direction viewed from an occupant seated on the vehicle seat S1. Further, the "up and down direction" is the up and down direction of the vehicle seat S1 and is the direction that coincides with the vertical direction when the vehicle is running on a horizontal plane. Further, the term "outside" means the one closer to the outside in the direction from the center of the vehicle seat unit to the outside and the term "inside" means the one closer to the center in the direction from the outside to the center of the vehicle seat unit.

Figure 1A:
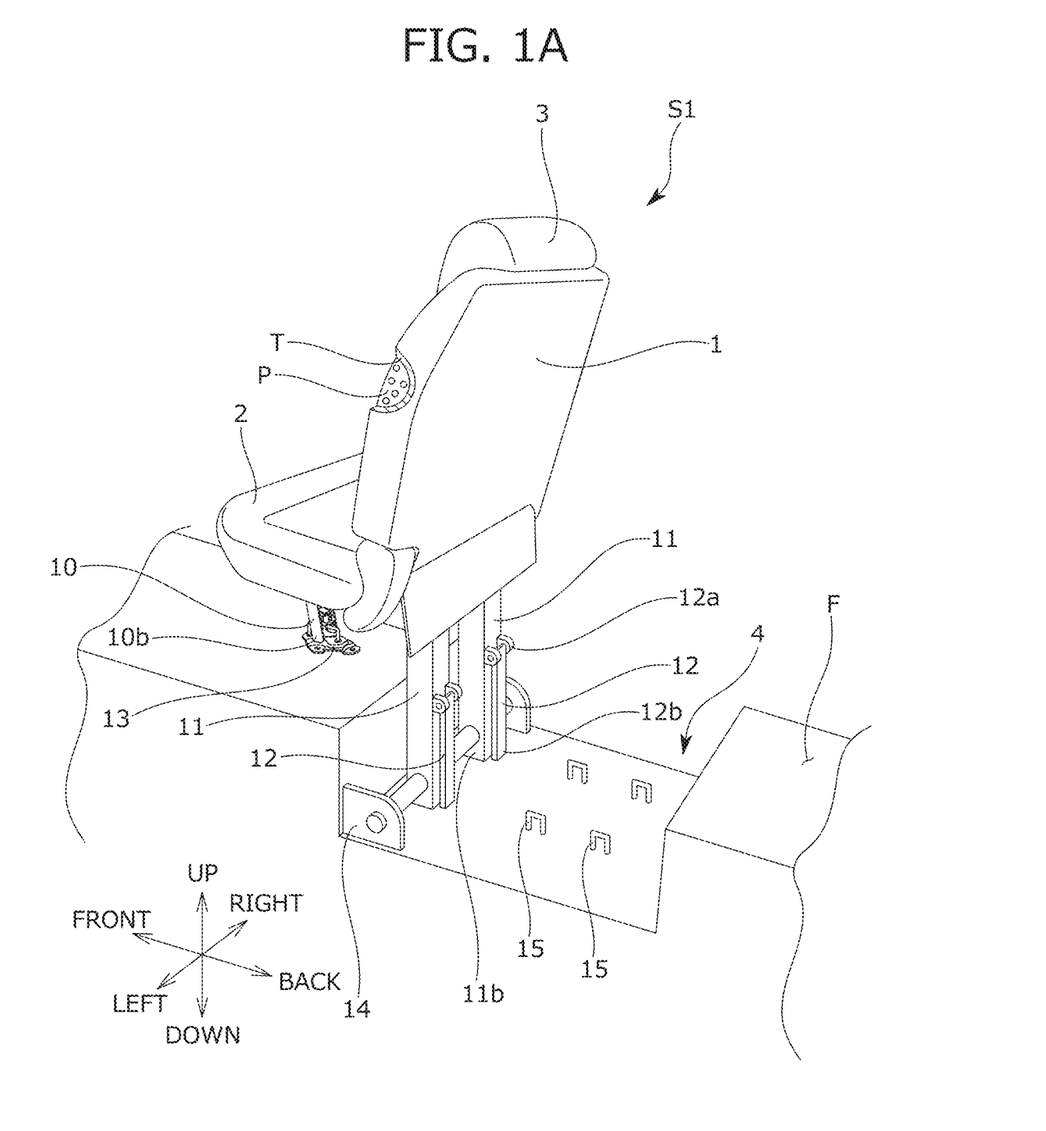
FIG. 1A is a perspective view of a vehicle seat of a first embodiment as viewed from a rear side.
Figure 1B:
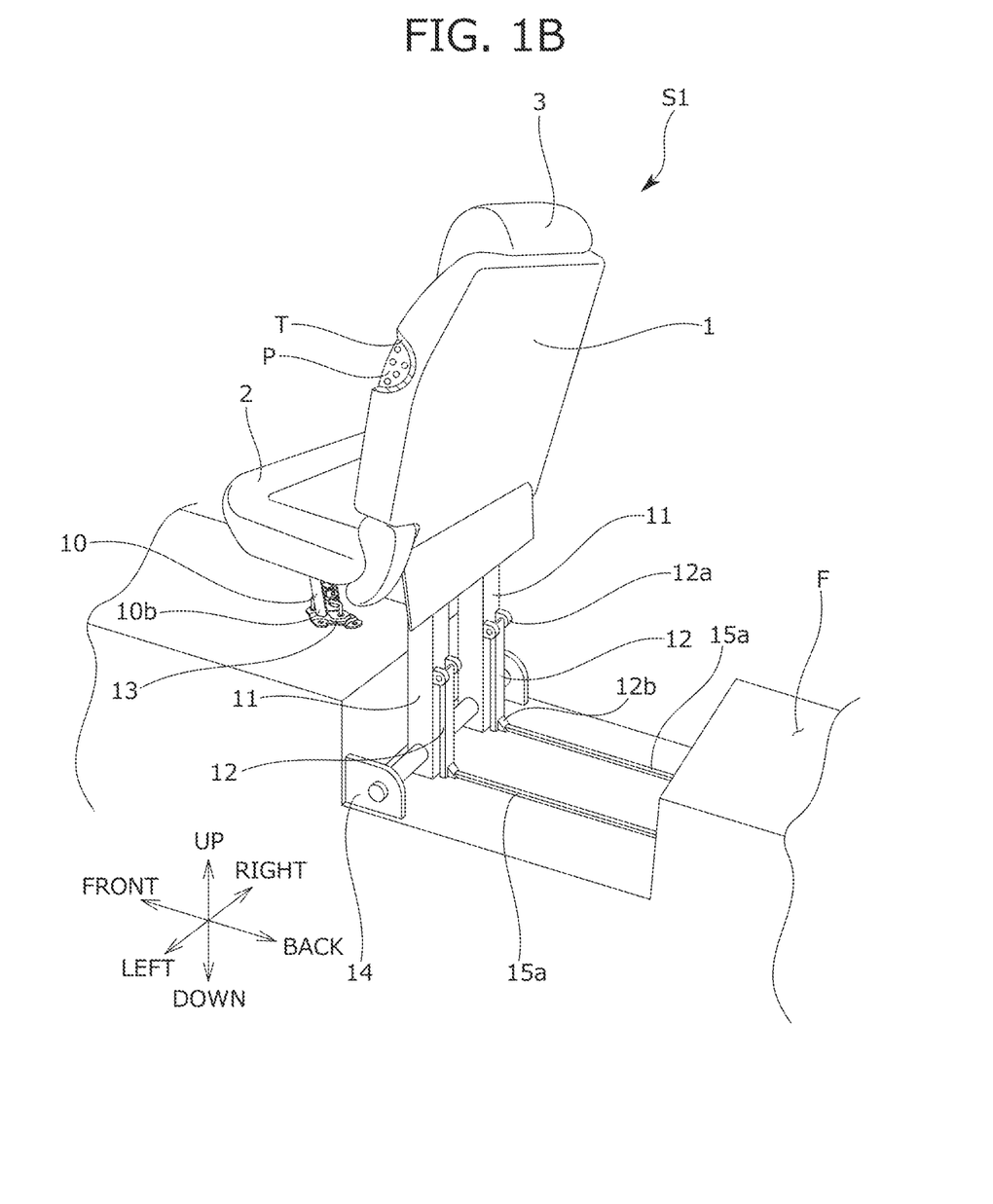
FIG. 1B is a perspective view showing another example of the vehicle seat.

As shown in FIG. 1, the vehicle seat S1 is a seat which is placed on a floor F of the vehicle and on which the occupant of the vehicle is seated. In this embodiment, the vehicle seat S1 is a rear seat corresponding to the rear seat of the vehicle. Additionally, the vehicle seat can also be used as a middle seat in a second row or a 3rd seat in a third row in a vehicle having three rows of seats in the front to back direction of the vehicle. Further, the vehicle seat can also be used as a front seat corresponding to the front seat.

The vehicle seat S1 includes, as shown in FIG. 1, a seat body which includes a seat back 1, a seat cushion 2, and a headrest 3. Further, the vehicle seat S1 is provided with a reclining device (not shown) rotatably connecting the seat back 1 to the seat cushion 2.

As shown in FIG. 1, the seat back 1 is a backrest portion that supports the back of the occupant from behind and is configured by placing a cushion pad P on a back frame (not shown) that serves as a skeleton and covering the cushion pad with a skin T.

The seat cushion 2 is a seating portion that supports the occupant from below and is configured by placing a cushion pad P on a cushion frame (not shown) that serves as a skeleton and covering the cushion pad with the skin T.

The headrest 3 is a head that supports the head of the occupant from behind and is configured by placing the cushion pad P on a pillar (not shown) that serves as a core material and covering the cushion pad with the skin T.

Additionally, the cushion pad P is a urethane base material molded by foam molding using, for example, a urethane foam material, and the skin T is made of a skin material such as cloth, synthetic leather, or genuine leather.

Figure 2:
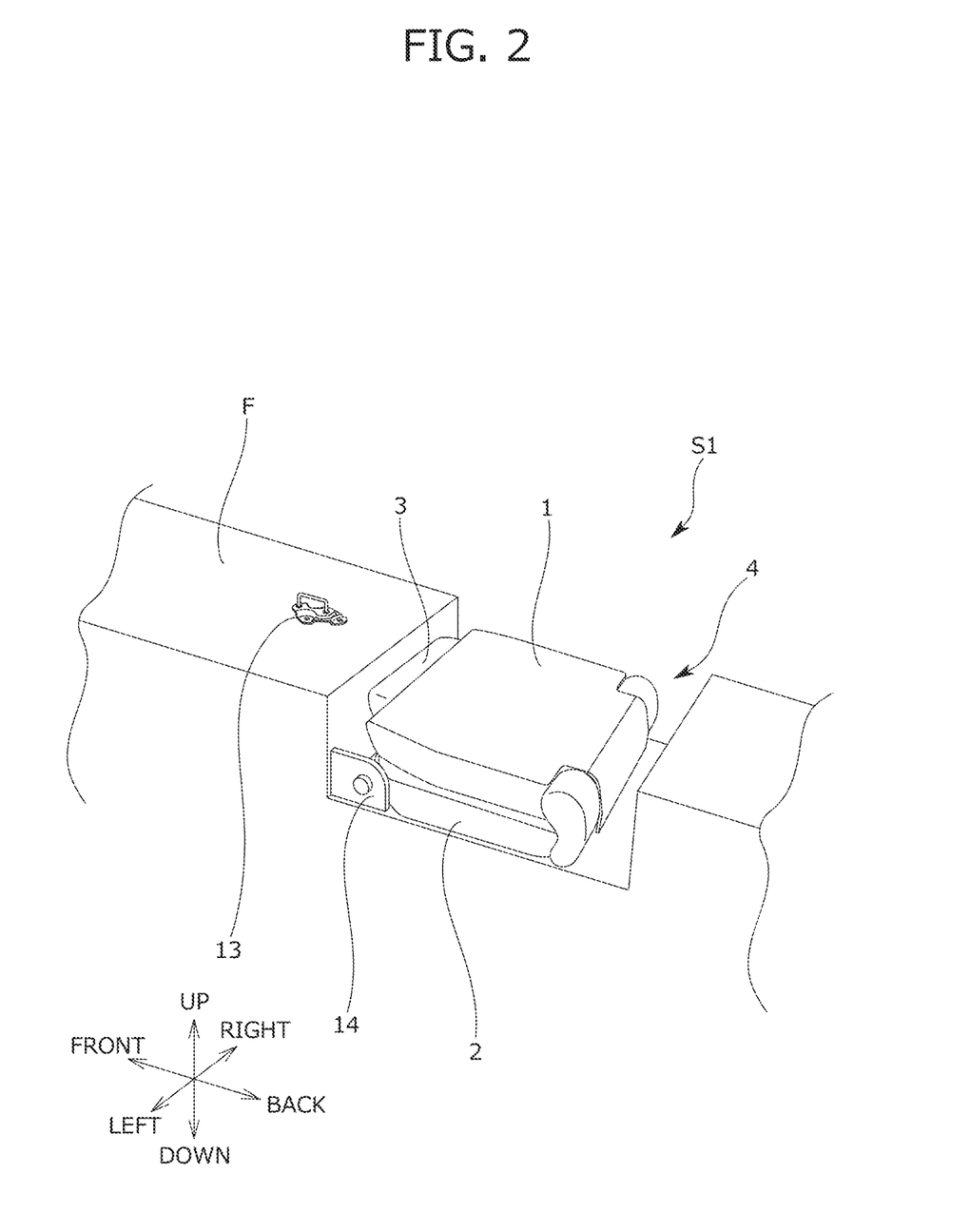
FIG. 2 is a perspective view showing the vehicle seat accommodated in a recess.

The vehicle seat S1 can be arranged in two forms as a usage state shown in FIG. 1 in which the occupant can sit and an accommodation state shown in FIG. 2 in which the seat body is accommodated in a recess 4 of a floor.

Further, it is also possible to move the seat body in a seatable state and change the height and the position of the seat cushion 2 in the front to back direction.

Additionally, when the vehicle seat S1 in the usage state is accommodated in the recess 4, the occupant pulls an operation strap so that the seat back 1 is tilted forward toward the seat cushion 2 and is folded. Then, the folded seat body is moved toward the rear side of the seat and is moved in a sinking direction. Accordingly, the seat body is accommodated in the recess 4.

As described above, the vehicle seat S1 is a seat that is accommodatable in the recess 4 formed in the floor F of the vehicle. As shown in FIG. 1, the seat cushion 2 is provided with one front leg portion 10 and two rear leg portions 11 and these leg portions support the seat body.

The front leg portion 10 supports a front lower portion of the seat cushion 2 and an upper end portion 10a which is one end of the front leg portion 10 is rotatably fixed at the front lower portion of the seat cushion 2. Further, a lower end portion 10b which is the other end of the front leg portion 10 is detachably fixed to a striker 13 (front fixing portion) provided on the floor F at a position in front of a front wall portion 4a of the recess 4.

Further, a rear leg portion 11 supports a rear lower portion of the seat cushion 2 and an upper end portion 11a which is one end of the rear leg portion 11 is rotatably fixed at the rear lower portion of the seat cushion 2. Further, a lower end portion 11b which is the other end of the rear leg portion 11 is rotatably fixed at the floor F inside the recess 4. Since the rear fixing portion 14 is rotatably fixed, the seat body is accommodatable in the recess 4 in such a manner that the locking of the lower end portion 10b of the front leg portion 10 is released, the lower end portion 10b is removed from the striker 13, and the seat body is moved backward.

The vehicle seat S1 of this embodiment includes an arm portion 12 provided at the rear leg portion. In the arm portion 12, an upper end portion 12a which is one end is rotatably fixed at the rear leg portion 11. Further, a lower end portion 12b which is the other end can be fixed to the floor F at a position behind the lower end portion lib of the rear leg portion 11.

As shown in FIG. 1A, the lower end portion 12b is fixed by providing a plurality of strikers 15 as arm fixing portions on the floor F and locking the position of the lower end portion 12b of the arm portion 12 by the striker 15.

Figure 3:
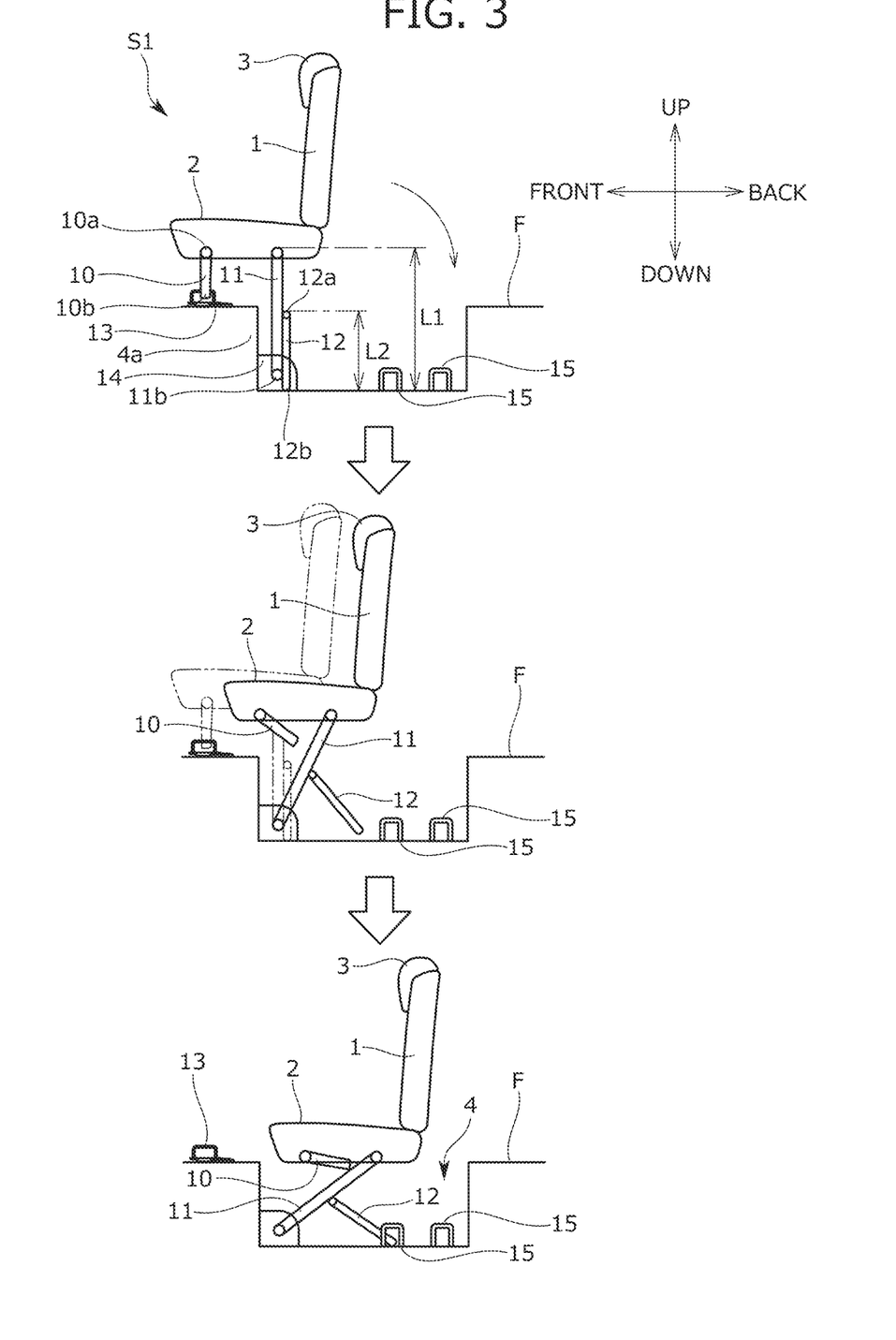
FIG. 3 is an explanatory diagram showing an operation of the vehicle seat.

Referring to FIG. 3, an operation of changing the form of the vehicle seat S will be described. In a normal state, the seat body is supported by the front leg portion 10 and the rear leg portion 11 while the lower end portion 10b of the front leg portion 10 is fixed to the striker 13 as shown in the upper stage of FIG. 3.

As shown in the middle stage of FIG. 3, the locking of the lower end portion 10b of the front leg portion 10 is released and the lower end portion 10b is removed from the striker 13. Accordingly, the seat body can be moved backward by tilting the rear leg portion 11 backward. At this time, the arm portion 12 is rotated backward by releasing the lock for fixing the arm portion.

As shown in the lower stage of FIG. 3, since the lower end portion 12b of the arm portion 12 is fixed to the striker 15, the arm portion 12 serves as a support bar that supports the rear leg portion 11 and the position of the seat body is fixed.

Further, when lowering the height of the seat body, the lower end portion 12b of the arm portion 12 is fixed to the striker 15 located at the further rear side.

In this way, according to the vehicle seat S1 of this embodiment, the height and position of the seat body can be changed while the seat can be seated, and the variation of the usage state can be expanded.

Further, as understood from FIGS. 1 and 3, the length L2 of the arm portion 12 is formed to be shorter than the length L1 of the rear leg portion 11. When the rear leg portion 11 is supported by the arm portion 12 as shown in the lower stage of FIG. 3 by shortening the length of the arm portion 12, the height of the seat body can be lower than the normal height.

Further, the fixing of the arm portion 12 by the striker 15 is an example. As shown in FIG. 1B, a bottom surface of the recess 4 may be provided with a slide rail 15a and the lower end portion 12b of the arm portion 12 may be fixed to be slidable in the front to back direction. By slidably fixing the lower end portion 12b of the arm portion 12, the front-back position and height of the seat body can be adjusted more finely. In this embodiment, the seat body moves backward and the height is also lowered by sliding the lower end portion 12b of the arm portion 12 backward.

Second Embodiment

Figure 4:
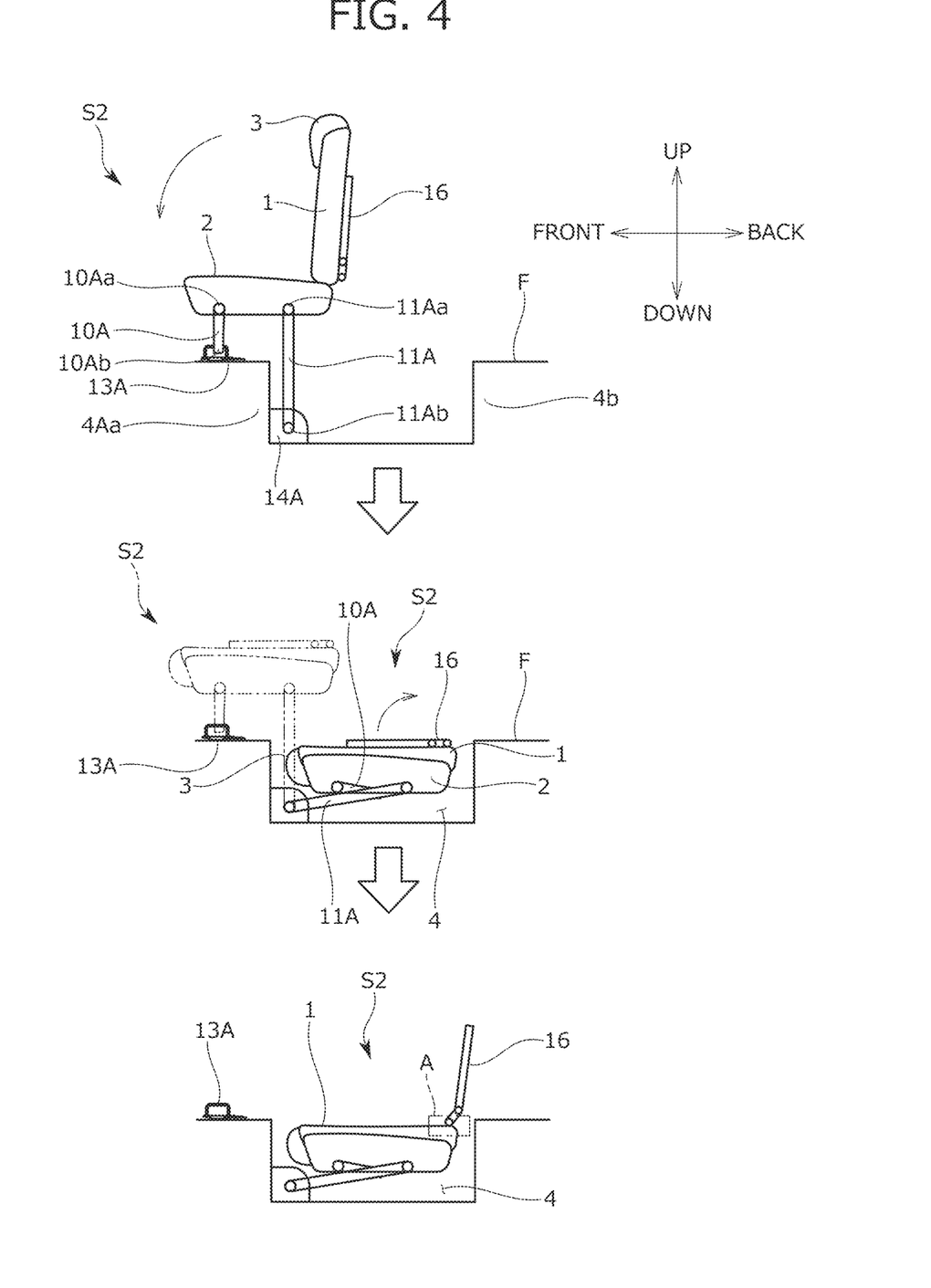
FIG. 4 is an explanatory diagram showing an operation of a vehicle seat of a second embodiment.
Figure 5:
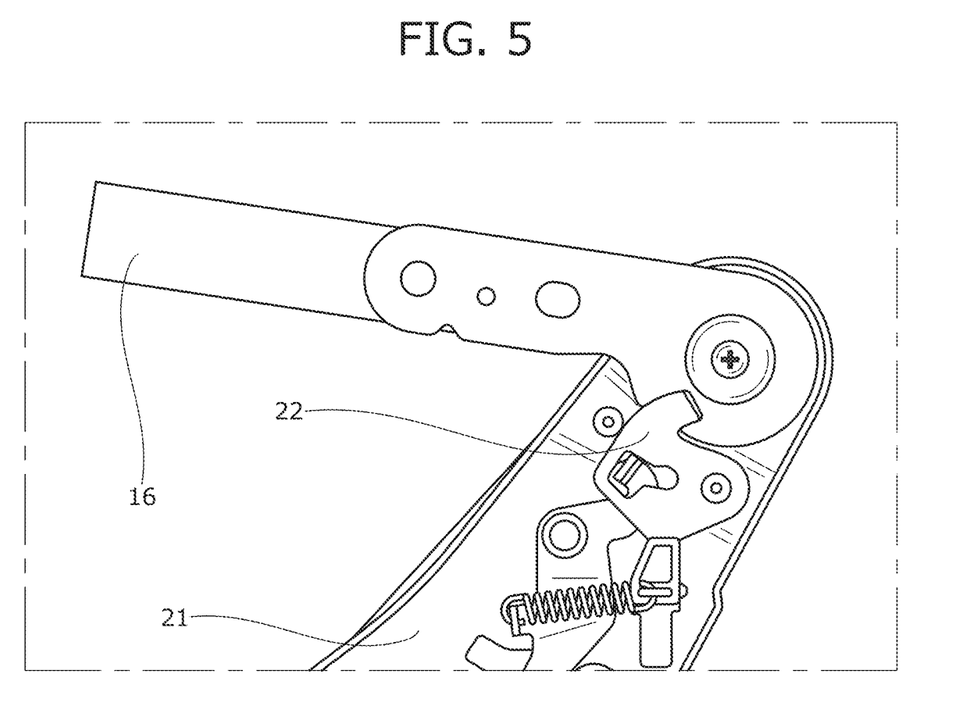
FIG. 5 is a diagram showing a flap locking mechanism.
Figure 6:
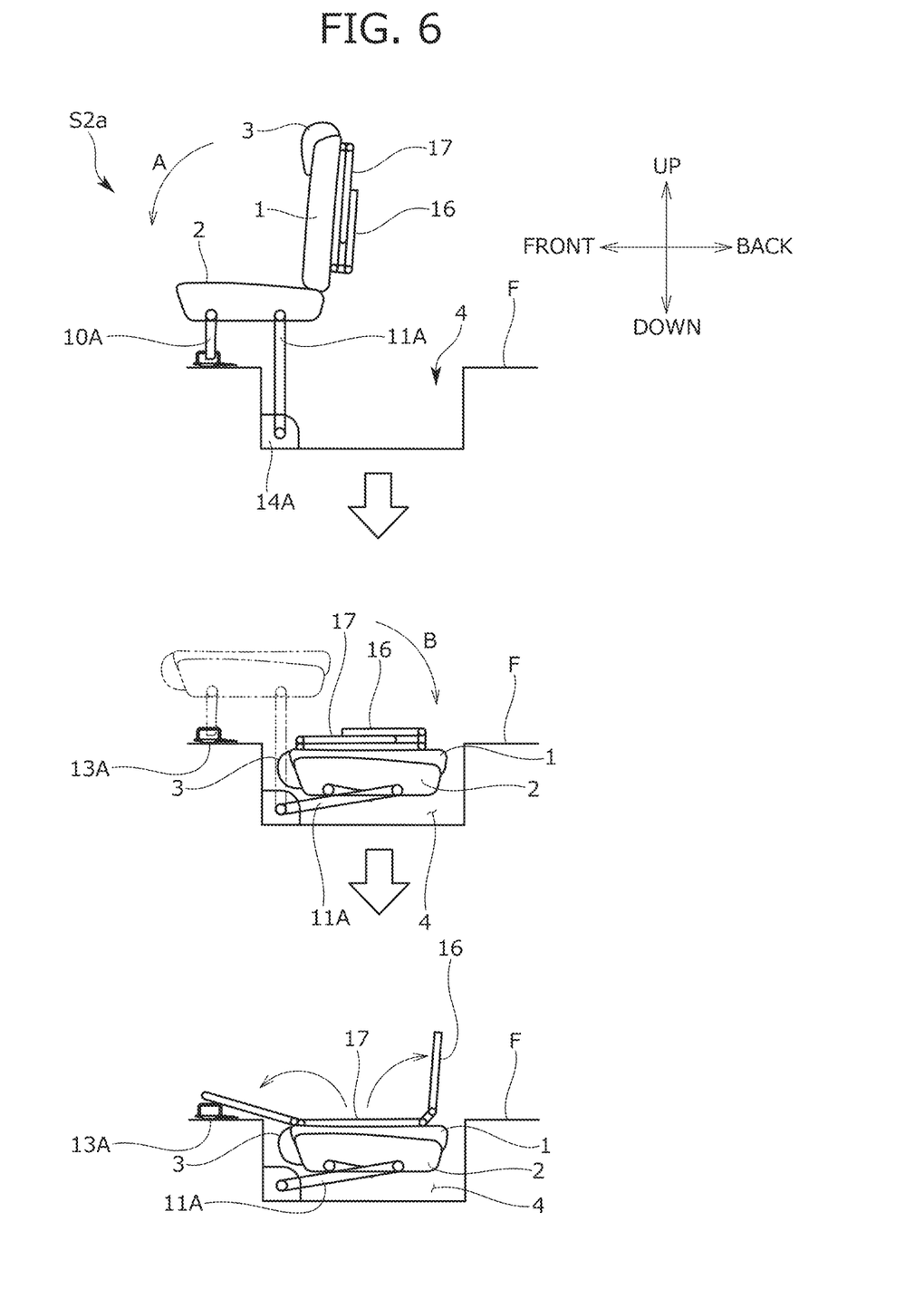
FIG. 6 is an explanatory diagram showing an operation of a vehicle seat having a cover portion.
Figure 7:
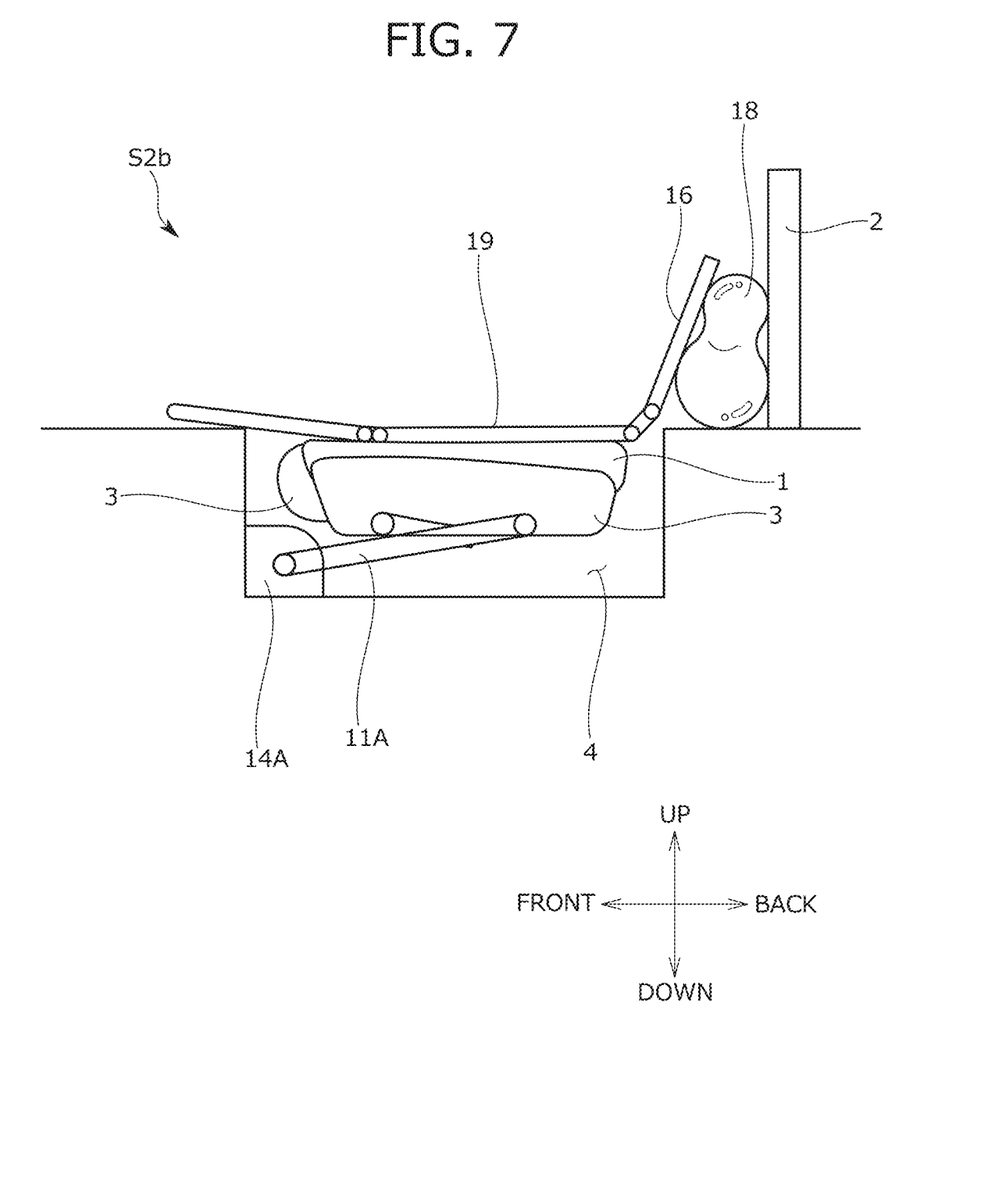
FIG. 7 is an explanatory diagram showing a vehicle seat having an airbag behind a flap.
Figure 8:
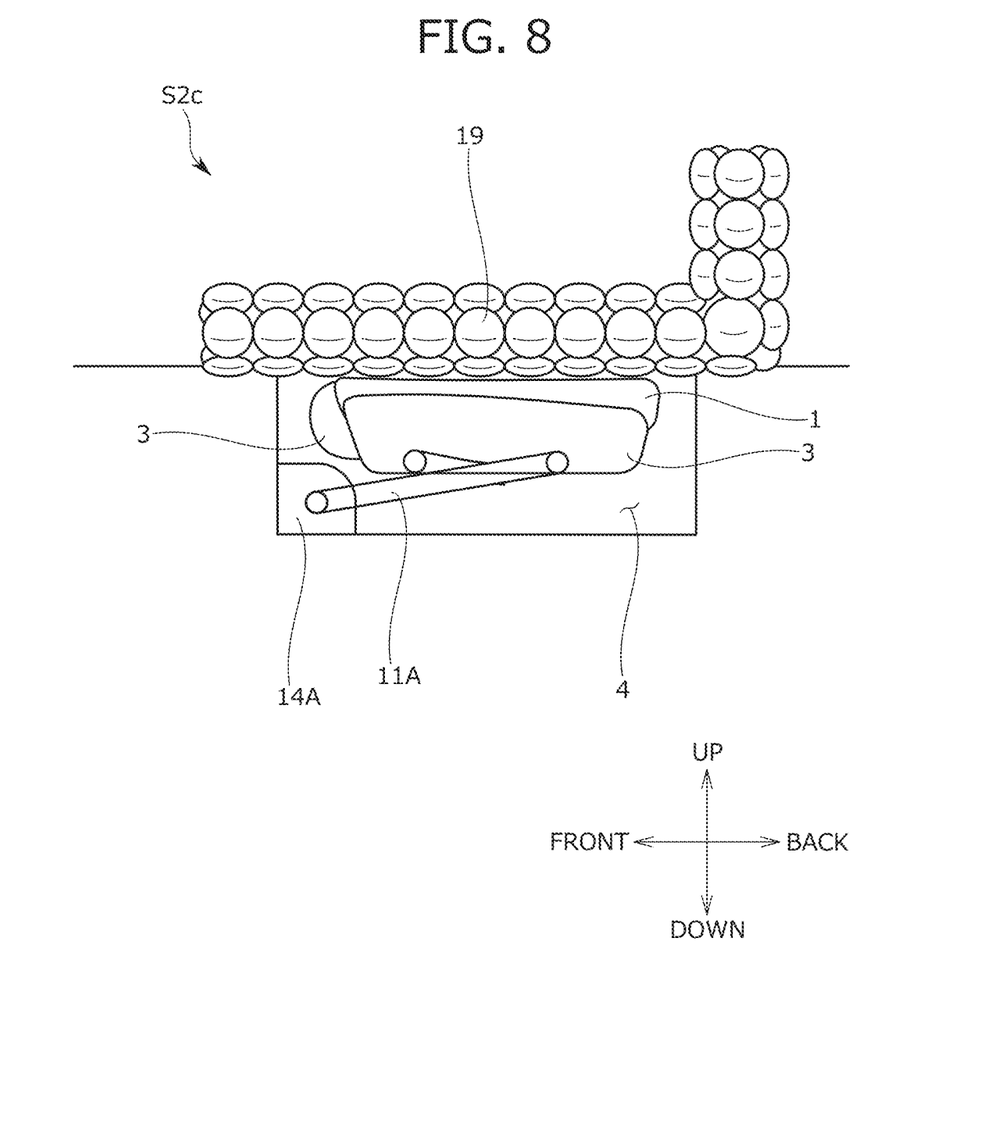
FIG. 8 is an explanatory diagram showing a vehicle seat having an air chair on a seat back.

A vehicle seat S2 which is a second embodiment of the present invention will be described with reference to FIGS. 4 to 8. FIG. 4 is an explanatory diagram showing an operation of the vehicle seat S2 of the second embodiment, FIG. 5 is a diagram showing a lock mechanism, and FIG. 6 is an explanatory diagram showing an operation of another example of the vehicle seat S2. FIGS. 7 and 8 are diagrams showing another example of the vehicle seat S2.

Similarly to the vehicle seat S1 of the first embodiment, the vehicle seat S2 is a seat which is placed on the floor F and on which the occupant of the vehicle is seated and is a seat which is accommodatable in the recess 4 formed on the floor F of the vehicle. Since the seat body (the seat back 1, the seat cushion 2, and the headrest 3) is the same as that of the vehicle seat S1 of the first embodiment, a description will be omitted.

Similarly to the front leg portion 10 of the first embodiment, a front leg portion 10A supports the front lower portion of the seat cushion 2 and an upper end portion 10Aa which is one end of the front leg portion 10A is rotatably fixed at the front lower portion of the seat cushion 2. Further, a lower end portion 10Ab which is the other end of the front leg portion 10A is detachably fixed to a striker 13A (front fixing portion) provided on the floor F at a position in front of the front wall portion 4a of the recess 4.

The rear leg portion 11A supports the rear lower portion of the seat cushion 2 and an upper end portion 11Aa which is one end of the rear leg portion 11A is rotatably fixed at the rear lower portion of the seat cushion 2. Further, the lower end portion 11Ab which is the other end of the rear leg portion 11A is rotatably fixed to the floor F inside the recess 4. Since the rear fixing portion 14A is rotatably fixed, the seat body is accommodatable in the recess 4 in such a manner that the locking of the lower end portion 10Ab of the front leg portion 10A is released, the lower end portion 10Ab is removed from the striker 13, and the seat body is moved backward.

Further, the vehicle seat S2 includes a flap 16 which is attached to be rotatable in the front to back direction on the rear surface portion of the seat back 1.

As shown in the upper stage of FIG. 4, the seat back 1 is tilted forward with respect to the seat cushion 2. The upper end portion 10Aa of the front leg portion 10A is rotatably fixed at the front lower portion of the seat cushion. As shown in the middle stage of FIG. 4, the seat body is accommodated in the recess 4 in such a manner that the locking of the lower end portion 10Ab of the front leg portion 10A is released, the lower end portion 10Ab is removed from the striker 13A, and the seat body is moved backward.

The flap 16 provided on the back surface of the seat back 1 is erected with the seat back tilted forward after the seat body is accommodated. By erecting the flap 16, the back surface of the seat back 1 that has been tilted forward can be used as a seating surface and the erected flap 16 can be used as a backrest.

Additionally, in order to erect the flap 16, as shown in FIG. 5, the flap 16 may be locked by using a lock mechanism 22 provided in the back frame 21 used when locking the vehicle seat S2 in a tip-up state. Even in the accommodation state, the vehicle seat S2 can be used for seating and the variation of the usage state is expanded.

FIG. 6 shows another example of the vehicle seat S2 of the second embodiment. As shown in the upper stage of FIG. 6, in a vehicle seat S2a shown in FIG. 6, a cover portion 17 which is folded between the back surface portion of the seat back 1 and the flap 16 is provided while the seat back 1 is erected.

As shown in the middle stage of FIG. 6, the seat back 1 is tilted forward and the seat body is accommodated in the recess. Then, as shown in the lower stage of FIG. 6, the flap 16 is erected. Then, the folded cover portion 17 is unfolded. The cover portion 17 is unfolded to be a seat surface and as shown in the lower stage of FIG. 6, the seating surface is stretched. By the stretching, the area of the seating surface is expanded and the variation of the usage state is expanded.

Further, similarly to the vehicle seat S2b shown in FIG. 7, when there is a wall portion 20 such as a rear gate behind the recess 4, an airbag 18 which is an inflatable or contractible airbag may be provided between the flap 16 and the wall portion 20. The airbag 18 protrudes from the wall portion 20 and supports the flap 16. By adjusting the amount of air in the airbag 18, the inclination amount of the flap in the front to back direction can be adjusted.

Further, similarly to the vehicle seat S2c shown in FIG. 8, an air chair 19 may be attached to the back surface portion of the seat back 1 instead of the flap 16. By inflating the air chair 19 while the seat body is accommodated in the recess 4, the seat can be used so that the height of the seating surface is different and the variation of the usage state is expanded.

Third Embodiment

Figure 9:
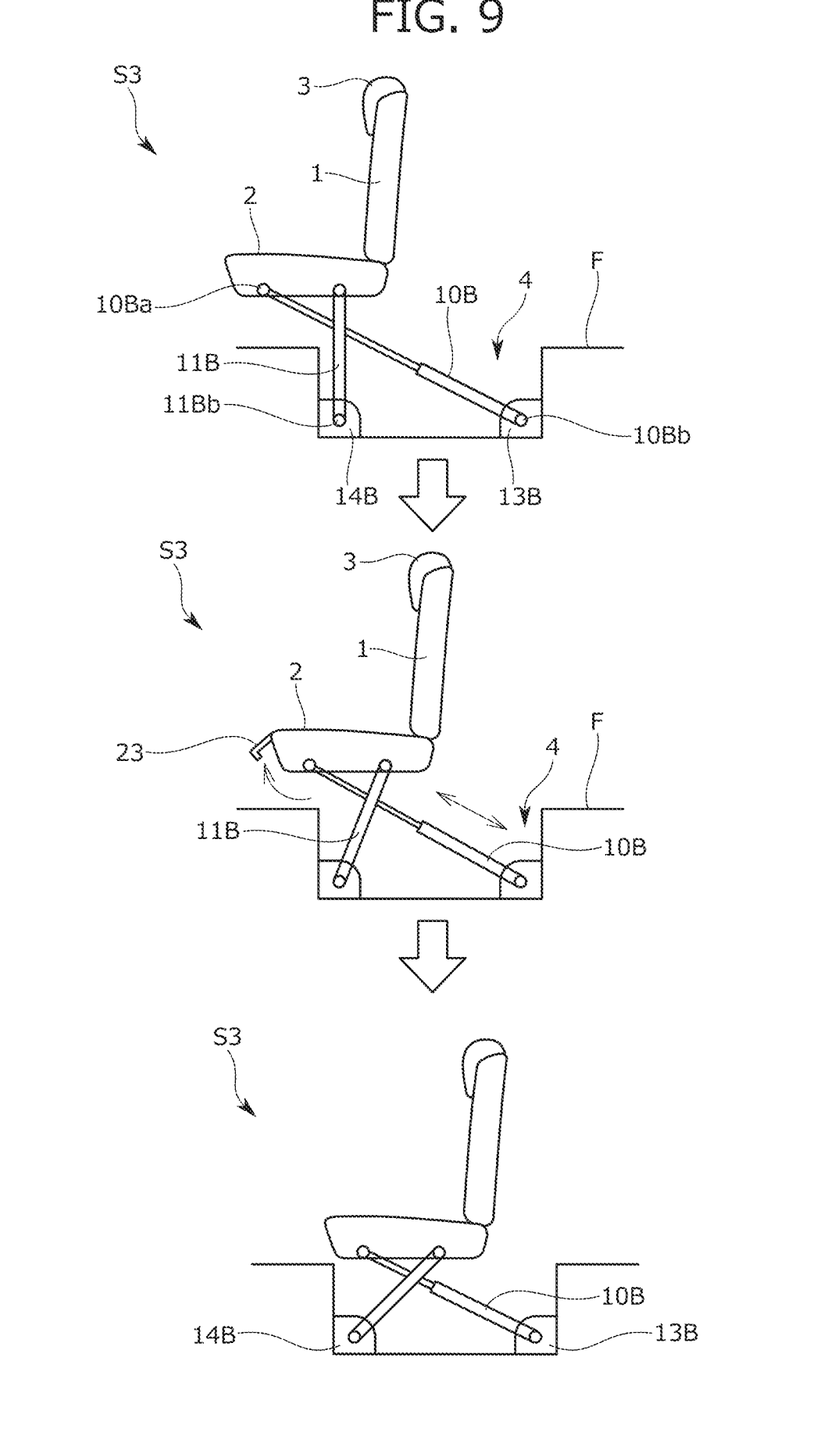
FIG. 9 is an explanatory diagram showing an operation of a vehicle seat of a third embodiment.

A vehicle seat S3 which is a third embodiment of the present invention will be described with reference to FIG. 9. FIG. 9 is an explanatory diagram illustrating an operation of the vehicle seat S3 of the third embodiment.

Similarly to the vehicle seat S1 of the first embodiment, the vehicle seat S3 is a seat which is placed on the floor F and on which the occupant of the vehicle is seated and is a seat which is accommodatable in the recess 4 formed on the floor F of the vehicle. Since the seat body (the seat back 1, the seat cushion 2, and the headrest 3) is the same as that of the vehicle seat S1 of the first embodiment, a description will be omitted. The vehicle seat S3 includes a front leg portion 10B which is different from the front leg portion 10 of the vehicle seat S1 of the first embodiment.

As shown in the upper stage of FIG. 9, the front leg portion 10B of the vehicle seat S3 supports the front lower portion of the seat cushion 2. An upper end portion 10Ba which is one end of the front leg portion 10B is rotatably fixed at the front lower portion of the seat cushion 2 and a lower end portion 10Bb which is the other end is rotatably fixed at the rear inside of the recess 4 by a front fixing portion 13B.

As shown in the upper stage of FIG. 9, a rear leg portion 11B of the vehicle seat S3 supports the front lower portion of the seat cushion 2. An upper end portion 11Ba which is one end of the rear leg portion 11B is rotatably fixed at the rear lower portion of the seat cushion 2 and a lower end portion 11Bb which is the other end is rotatably fixed at the front inside of the recess 4 by a rear fixing portion 14B.

The front leg portion 10B is formed to be stretchable and can be locked to a predetermined or arbitrary position. As shown in the middle stage of FIG. 9, when a lever 23 provided in front of the seat cushion 2 is raised (rotated in the direction of the arrow A), the locking of the front leg portion 10B is released and the length of the front leg portion 10B can be changed (the direction of the arrow B). When the front leg portion 10B is shortened and the rear leg portion 11B is tilted backward, the seat body can be moved backward and the height can be lowered. As shown in the lower stage of FIG. 9, the seat body can be used by locking and fixing the expansion and contraction of the front leg portion 10B at a desired position.

When the length of the front leg portion 10B is further shortened, the seat body is accommodatable in the recess 4. In this way, the vehicle seat S3 can be used so that the height of the seating surface is different and the variation of the usage state is expanded.

Additionally, in the vehicle seat S3 of this embodiment, the front leg portion 10B is formed to be stretchable, but the rear leg portion 11B may be formed to be stretchable. In this case, the vehicle seat moves from the rear side to the front side of the recess 4. Further, both the front leg portion 10B and the rear leg portion 11B may be formed to be stretchable.

The vehicle seat of this embodiment has been described above with reference to the drawings. Additionally, the present invention is not limited to a vehicle seat mounted on a ground traveling conveyance having wheels such as an automobile or a railroad and can be also applied to, for example, a seat mounted on an aircraft or a ship that moves outside the ground.

REFERENCE SIGNS LIST

S1, S2 to S2c, S3: vehicle seat (conveyance seat)
1: seat back
2: seat cushion
3: headrest
4: recess
   4a: front wall portion
T: skin
P: cushion pad
F: floor
10, 10A, 10B: front leg portion
   10a, 10Aa, 10Ba: upper end portion (one end)
   10b, 10Ab, 10Bb: lower end portion (other end)

11, 11A, 11B: rear leg portion
  11a, 11Aa, 11Ba: upper end portion (one end)
  11b, 11Ab, 11Bb: lower end portion (other end)
12: arm portion
  12a: upper end portion (one end)
  12b: lower end portion (other end)
13, 13A: striker
13B: front fixing portion
14, 14A, 14B: rear fixing portion
15: striker
15a: slide rail
16: flap
17: cover portion
18: airbag
19: air chair
20: wall portion
21: back frame
22: lock mechanism
23: lever

The invention claimed is:

1. A conveyance seat which is accommodatable in a recess formed on a floor of a conveyance, comprising:
  a seat cushion;
  a front leg portion which supports a front lower portion of the seat cushion and of which one end is rotatably fixed to the front lower portion of the seat cushion and the other end is detachably fixed to the floor at a position in front of the recess;
  a rear leg portion which supports a rear lower portion of the seat cushion and of which one end is rotatably fixed to the rear lower portion of the seat cushion and the other end is rotatably fixed to the floor inside the recess;
  an arm portion of which one end is rotatably fixed to the rear leg portion and the other end is fixable to the floor at a position behind the other end of the rear leg portion; and
  wherein the other end of the arm portion is movable in a manner that changes a distance between the other end of the arm portion and the other end of the rear leg portion.

2. The conveyance seat according to claim 1, further comprising:
  a front fixing portion which is provided on a front side of a front wall portion of the recess and fixes the other end of the front leg portion to the floor;
  a rear fixing portion which is provided inside the recess and fixes the other end of the rear leg portion to the floor;
  an arm fixing portion which is provided behind the rear fixing portion and connects the other end of the arm portion to the floor; and
wherein the arm fixing portion is capable of changing a position to fix the other end of the arm portion.

3. The conveyance seat according to claim 2,
wherein the other end of the arm portion is fixed to the arm fixing portion to be slidable in a front to back direction.

4. The conveyance seat according to claim 2,
wherein a plurality of strikers as the arm fixing portion are arranged in the front to back direction on the floor, and
wherein the other end of the arm portion is connected to the floor by locking to one of the plurality of strikers.

5. The conveyance seat according to claim 2,
wherein the arm portion is attached to face the rear surface of the rear leg portion in the front to back direction of the seat.

6. The conveyance seat according to claim 2,
wherein the seat cushion and the front fixing portion are positioned at the same height when the other end of the arm portion is connected to the arm fixing portion.

7. The conveyance seat according to claim 2,
wherein a gap is formed between the rear end of the seat cushion and the rear wall of the recess, when the other end of the arm portion is connected to the arm fixing portion.

8. The conveyance seat according to claim 2,
wherein a gap is formed between the front end of the seat cushion and the front wall of the recess, when the other end of the arm portion is connected to the arm fixing portion.

9. The conveyance seat according to claim 1,
wherein the length of the arm portion is shorter than the length of the rear leg portion, and
wherein a rotation axis of the arm portion is provided between a rotation axis on the floor side of the rear leg portion and a rotation axis on the seat cushion side of the rear leg portion.

10. The conveyance seat according to claim 9,
wherein the rotation axis of the arm portion is attached to the rear surface of the rear leg portion.

11. The conveyance seat according to claim 10,
wherein the rotation axis of the arm portion is attached to the center of the rear leg portion.

12. The conveyance seat according to claim 1,
wherein the arm portion is fixed to the rear leg portion at a position below the lower end of the front leg portion.

13. The conveyance seat according to claim 1,
wherein the arm portion is fixed to the rear leg portion at a position below the floor surface of the floor.

* * * * *